March 30, 1943.　　C. E. FRASER　　2,315,252
FILTER CHANNEL SCRAPER
Filed June 25, 1940　　2 Sheets-Sheet 1
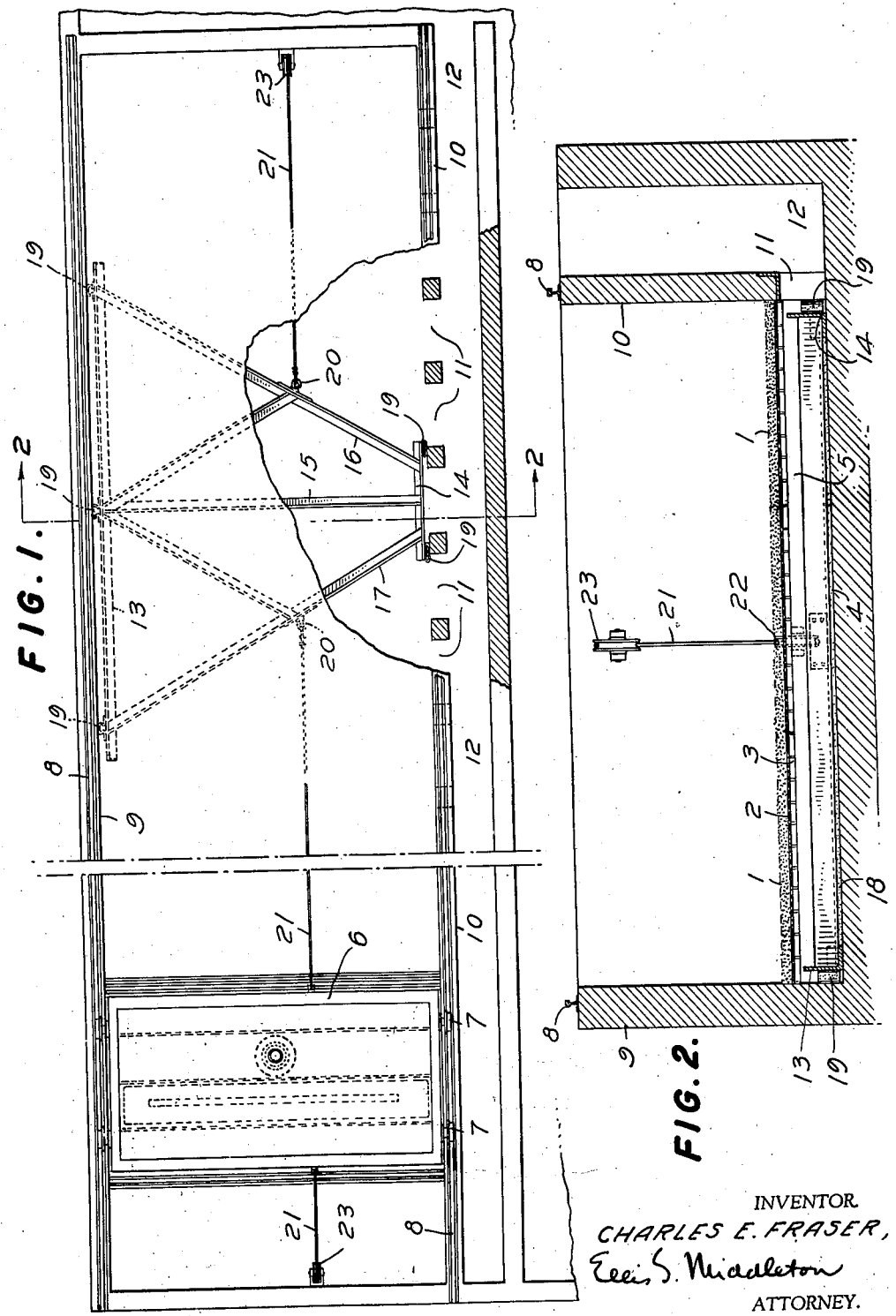
INVENTOR.
CHARLES E. FRASER,
Ellis S. Middleton
ATTORNEY.

March 30, 1943.  C. E. FRASER  2,315,252
FILTER CHANNEL SCRAPER
Filed June 25, 1940  2 Sheets-Sheet 2
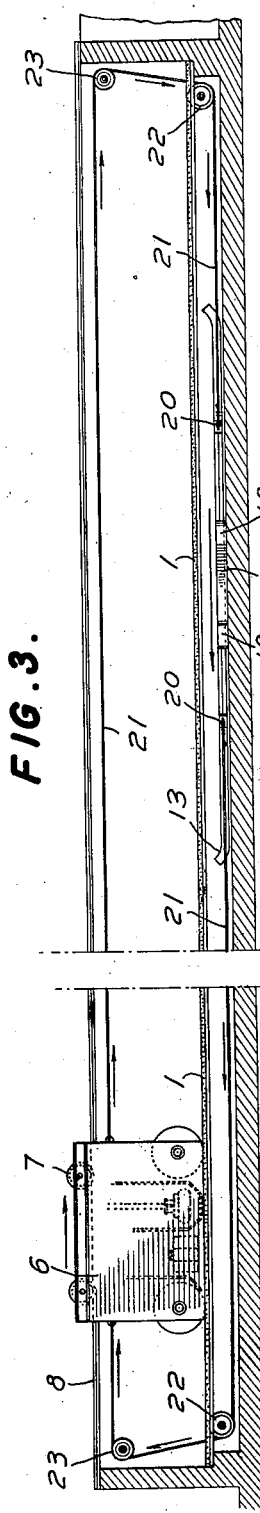
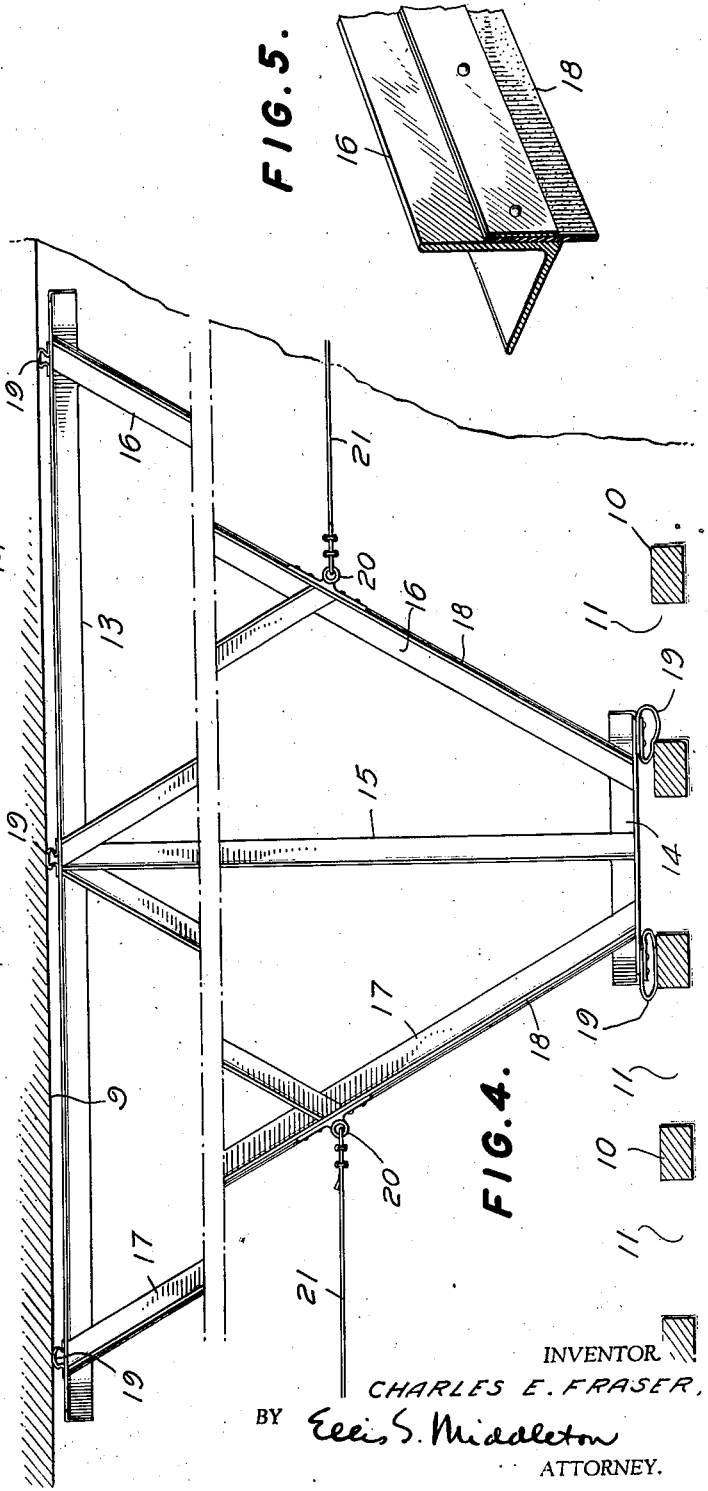
INVENTOR
CHARLES E. FRASER,
BY Ellis S. Middleton
ATTORNEY.

Patented Mar. 30, 1943

2,315,252

UNITED STATES PATENT OFFICE 2,315,252

FILTER CHANNEL SCRAPER

Charles E. Fraser, Kew Gardens, N. Y.

Application June 25, 1940, Serial No. 342,251

4 Claims. (Cl. 210—128)

The present invention relates to a device for cleaning a channel located beneath a filter bed.

Filtering systems are either of an upflow or downflow type, that is, where either the unfiltered influent flows up through the bed under hydraulic head, depositing in the bed material the dirt carried by the influent, clean or filtered effluent rising above the bed to the desired height from which it is removed or, in the case of filters of the downflow type, a reverse action takes place, the unfiltered influent being flowed on top of the bed and under hydraulic head, flows through the bed, leaving its entrained solids in the bed material, clean effluent being discharged from beneath the bed.

In either case, the liquid passing through the channel contains a considerable amount of living organic matter which, under favorable conditions, has a tendency to adhere to the bottom of the channel and grow. This growth is objectionable both from the standpoint that the growth in time will clog the channel, this growth is often putrescent and in downflow filters, pieces of the growth break off and thus recontaminate the clean effluent with solid matter.

The principal object of the present invention, therefore, is to periodically or continuously scrape or squeegee this deposit or growth so as to prevent the above objectionable results.

To this end, the invention contemplates a scraper engaging the bottom of the channel beneath a filter bed with means to move the scraper thereover. Inasmuch as most filter bed channels are provided with inlet or outlet ports laterally thereof, the invention contemplates the construction of a scraper so that the loosened material will be directed toward these ports for removal from the channel.

The invention further contemplates using a travelling cleaner, where the filter is of the thin bed variety and such a device is provided for intermittently cleaning sections of the bed, as the motive power for causing the scraper to move in one direction when applied to circular filter channels or with a back and forth movement as applied to the channels of rectangular filter beds.

The invention further consists in the novel arrangements, combination and construction of parts more fully hereinafter described and shown in the accompanying drawings, in which—

Fig. 1 is a plan view of a filter assembly equipped with a device embodying the present invention;

Fig. 2 is a sectional end view of the combination of Fig. 1;

Fig. 3 is a side elevation partly in section of Fig. 1;

Fig. 4 is a detailed plan view of the scraper itself;

Fig. 5 is an enlarged fragmentary perspective view showing a squeegee attachment.

Referring now with particularity to Fig. 2, a filter bed is shown at 1 of any suitable material, such as sand of the magnetite or silica variety or any other filter aggregate resting upon a screen 2, supported by grid 3 held a sufficient distance above the bottom of filter tank 4 so as to form there a channel 5.

As shown, this particular filter system is provided with a travelling cleaner device shown generally at 6 mounted upon wheels 7 movable on trackway 8 on top of side walls 9 and 10. This cleaning device is of a popular type for intermittently cleaning sections of the bed, the details of which play no part in the present invention.

It is to be noted that in Fig. 2, the side wall 10 is provided with lateral ports 11 which form a continuation of the channel 5, thus providing a communication with ditch 12. In upflow filters, influent to be filtered moves along the ditch 12, through inlet ports 11, thus approaching the bottom of the filter through channel 5. In downflow filters, the clean effluent from the bottom of the filter is caught in channel 5, passes through outlet ports 11 and into ditch 12 for further disposition.

In either case, there is a tendency for deposition of organic matter of a more or less objectionable nature on the bottom of the channel 5. In order to remove this deposit, a scraper is provided shown more in detail in Figs. 1 and 4.

There it may consist of a frame work including a long side element 13 and an opposite shorter side member 14 connected by an intermediate strut 15. A leading edge may be formed by angle iron 16 and a trailing edge by a similar part 17, both the leading and trailing edge members being arranged at an angle, the inclination being such that material scraped or swept thereby has a tendency to move toward the ports 11.

To facilitate clean sweepage of the bottom of the channel 5, a squeegee 18 of rubber or the like may be attached to the members 16 and 17, as shown in Fig. 5.

The scraper proper is also provided with spacers 19 of rubber or the like engageable with the walls 9 and that part of the wall 10 between ports 11. This serves to maintain the scraper assembly in proper alignment with the walls.

A convenient manner of operating the scraper is to provide eyes 20 on each side thereof, to which is attached a flexible connection 21, such as a cable or chain which passes over lower sheaves 22 at the bottom of the filter tank, upper sheaves 23 near the top thereof and terminating at and fastened to the cleaner trolley or mechanism 6. As a consequence, as the cleaner moves over the bed in a to and fro manner, it drags the scraper in an opposite direction. Consequently, during this action and upon reversal of movement, the parts 16 and 17 may each be both a trailing and a leading edge alternatively as the direction of travel of the scraper is reversed.

It has been found that when a filter channel beneath the bed has once been thoroughly cleaned, if a scraper is put into operation thereafter and used more or less continuously, the amount of growth or deposit moved into the clean effluent in downflow filters is negligible. In downflow filters, of course, it makes no great difference because any solid matter dislodged from the channel is caught by the filter during the passage therethrough of the unfiltered influent.

This scraping device, therefore, keeps the filter channel completely free of objectionable material in a simple and efficient manner.

While the invention has been shown and described with particular reference to specific embodiments, it is to be understood that it is not to be limited thereto but is to be construed broadly and restricted solely by the scope of the appended claims.

I claim:

1. A scraper device for removing objectionable material from a channel beneath a downflow filter bed, including a scraper having a diagonal leading edge arranged to move scraped material to one side when moved in one direction and a diagonal trailing edge arranged to move the scraped material to the same side of the channel when moved in the opposite direction, each of said edges being provided with a squeegee engaging the bottom of the channel, and means to move the scraper back and forth over the bottom of the channel to direct the scraped matter to said side of the channel.

2. The device of claim 1 in which the moving means includes a flexible connector secured to the scraper and extending outwardly therefrom in opposite directions, over sheaves and connected to a travelling cleaner movable over the bed in a direction opposite to that in which the scraper travels.

3. In combination, a filter bed through which fluid flows downwardly, a channel beneath the same, a cleaner device movable over the bed, a scraper in the channel, the channel having a port through one side thereof, an angular leading edge on the scraper tending to direct scraped matter into the lateral port, means for moving the cleaner over the bed, and means connecting the cleaner with the scraper whereby travel of the former moves the latter in the channel.

4. In combination, in a downflow filter, a filter bed, a relatively shallow channel immediately beneath the same closed at one lateral side, the other side of the channel comprising walls having ports therein to permit matter flowing into the channel to escape through the ports, a scraper in the channel having diagonal leading and trailing edges, each of which is equipped with a squeegee engaging the channel bottom, means to move the scraper over the channel in opposite directions, the diagonal edges and their squeegees being so arranged that in either direction of movement, matter scraped by the squeegee will be directed toward the ports, and means on each of two lateral sides of the scraper for engaging the walls of the channel to keep the scraper positioned therein.

CHARLES E. FRASER.